United States Patent
Trutwin et al.

(10) Patent No.: US 6,202,380 B1
(45) Date of Patent: Mar. 20, 2001

(54) BASEBOARD MOLDING WITH PASSAGE FOR RUNNING ELECTRICAL CONDUIT THERETHROUGH

(76) Inventors: James J. Trutwin; Douglas J. Larson, both of 7416 W. 103rd St., Bloomington, MN (US) 55438

(*) Notice: Subject to any disclaimer, the term of this patent is extended or adjusted under 35 U.S.C. 154(b) by 0 days.

(21) Appl. No.: 09/262,174

(22) Filed: Mar. 4, 1999

(51) Int. Cl.[7] .................................................. E04C 2/38
(52) U.S. Cl. ................... 52/718.04; 52/212; 52/287.1; 52/288.1; 52/716.1; 52/717.01; 174/48
(58) Field of Search ........................... 52/204.53, 204.54, 52/211, 212, 287.1, 288.1, 311.2, 716.1, 717.01, 717.05, 718.04, 718.01, 718.06, 717.03; 174/48, 101

(56) References Cited

U.S. PATENT DOCUMENTS

| | | | |
|---|---|---|---|
| 3,707,061 | * 12/1972 | Collette et al. | 52/287 |
| 4,423,284 | * 12/1983 | Kaplan | 174/101 |
| 4,534,147 | * 8/1985 | Cristell | 52/287 |
| 5,001,877 | * 3/1991 | Edwards | 52/288 |
| 5,096,753 | * 3/1992 | Mc Cue et al. | 428/31 |
| 5,353,571 | * 10/1994 | Berdan et al. | 52/716.5 |
| 5,433,048 | * 7/1995 | Strasser | 52/288.1 |
| 5,444,954 | * 8/1995 | Anderson | 52/288.1 |
| 5,598,681 | * 2/1997 | Digianni | 52/717.05 |
| 5,694,726 | * 12/1997 | Wu | 52/287.1 |
| 6,021,619 | * 2/2000 | Mansson | 52/716.1 |

* cited by examiner

*Primary Examiner*—Carl D. Friedman
*Assistant Examiner*—Yvonne M. Horton

(57) ABSTRACT

A baseboard molding with passage for running electrical conduit therethrough for running electrical conduit such as cable wires, stereo wires, and computer wires along a wall structure behind a baseboard molding. The baseboard molding with passage for running electrical conduit therethrough includes a top piece and a bottom piece. The top piece has a longitudinal tongue ridge downwardly extending from a bottom face of the top piece. A bottom piece has a top, a bottom, front and back faces extending between the top and bottom of the bottom piece, and upper and lower portions. The top of the bottom piece has a spaced apart front and back extents upwardly extending therefrom which define a longitudinal groove therebetween. The tongue ridge of the top piece is inserted into the longitudinal groove of the bottom piece. The upper and lower portions of the bottom piece forming a lower shoulder therebetween on the back face of the bottom piece. The lower shoulder of the bottom piece and the bottom face of the top piece define a rear conduit channel therebetween extending along the back face of the bottom piece. The lower portion of the bottom piece has at least one access channel in the back face of the bottom piece and extending between the rear conduit channel and the bottom of the bottom piece.

8 Claims, 2 Drawing Sheets

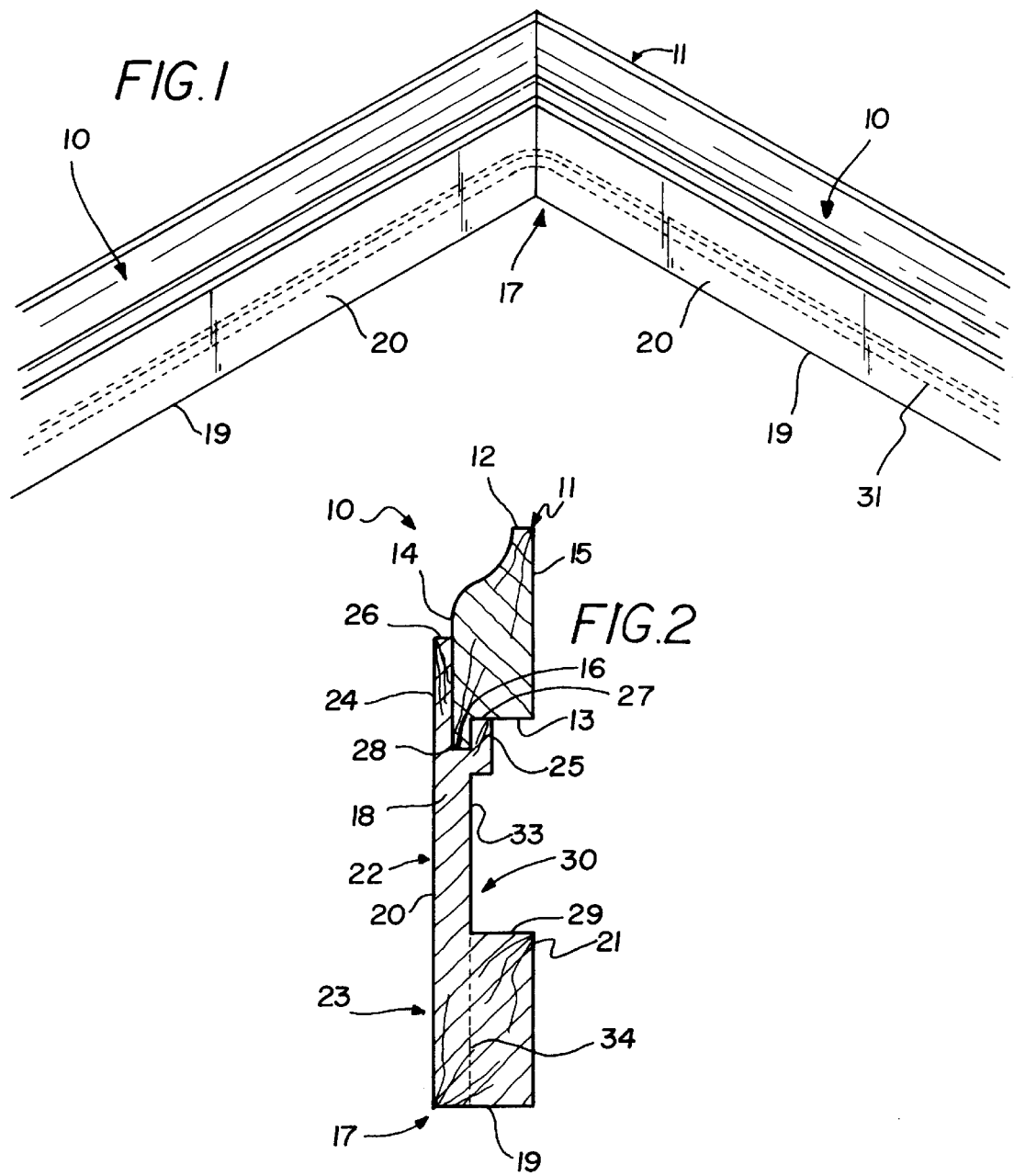

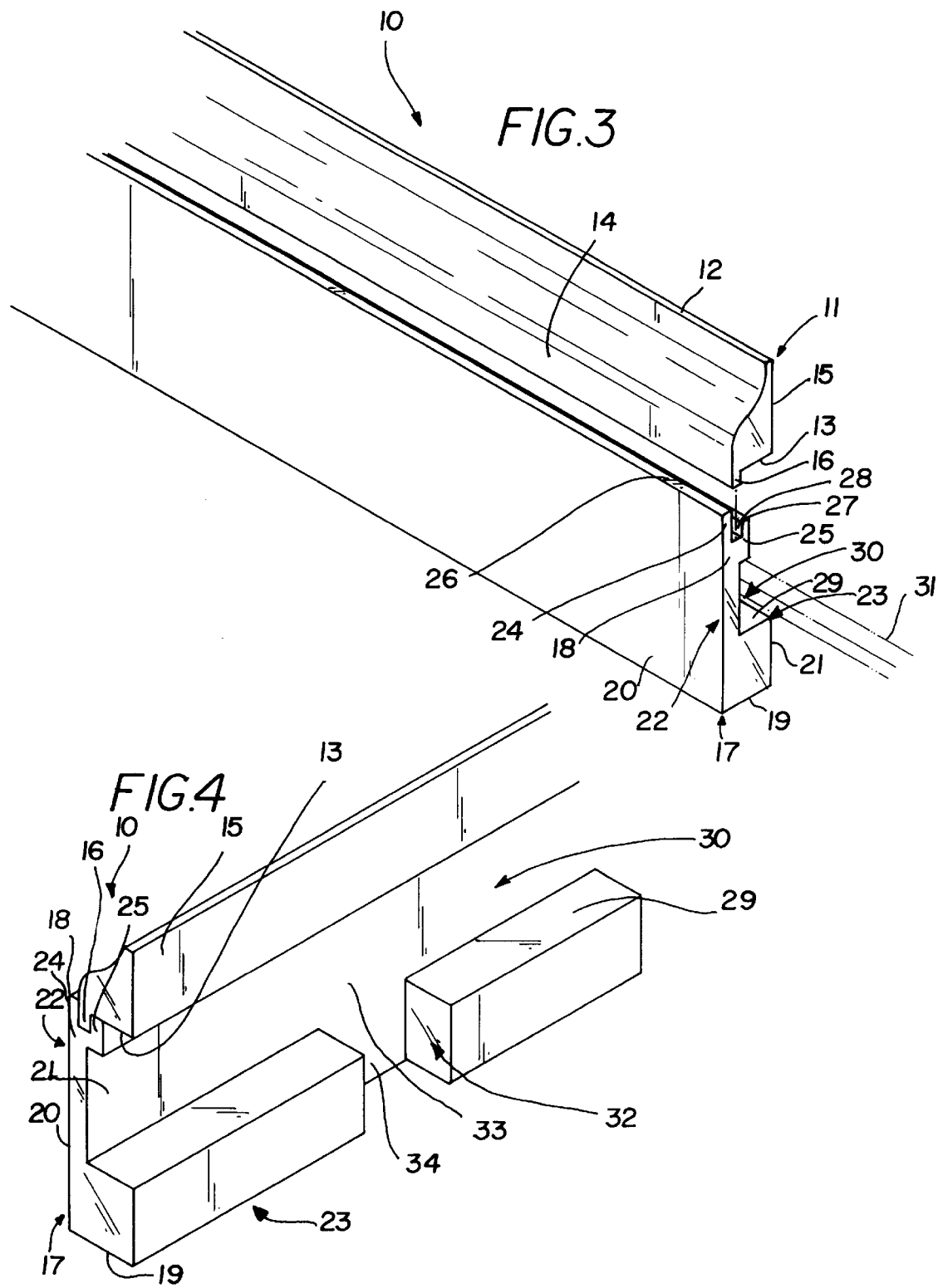

BASEBOARD MOLDING WITH PASSAGE FOR RUNNING ELECTRICAL CONDUIT THERETHROUGH

BACKGROUND OF THE INVENTION

1. Field of the Invention

The present invention relates to baseboard molding systems and more particularly pertains to a new baseboard molding with passage for running electrical conduit therethrough for running electrical conduit such as cable wires, stereo wires, and computer wires along a wall structure behind a baseboard molding.

2. Description of the Prior Art

The use of baseboard molding systems is known in the prior art. More specifically, baseboard molding systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,175,144 by Davison; U.S. Pat. No. Des. 354,733 by Ingraham; U.S. Pat. No. 4,423,284 by Kaplan; U.S. Pat. No. 4,534,147 by Cristell; U.S. Pat. No. 4,037,900 by Schmidger; and U.S. Pat. No. 1,984,355 by Abbott.

While these devices fulfill their respective, particular objectives and requirements, the aforementioned patents do not disclose a new baseboard molding with passage for running electrical conduit therethrough. The inventive device includes a top piece and a bottom piece. The top piece has a longitudinal tongue ridge downwardly extending from a bottom face of the top piece. A bottom piece has a top, a bottom, front and back faces extending between the top and bottom of the bottom piece, and upper and lower portions. The top of the bottom piece has a spaced apart front and back extents upwardly extending therefrom which define a longitudinal groove therebetween. The tongue ridge of the top piece is inserted into the longitudinal groove of the bottom piece. The upper and lower portions of the bottom piece forming a lower shoulder therebetween on the back face of the bottom piece. The lower shoulder of the bottom piece and the bottom face of the top piece define a rear conduit channel therebetween extending along the back face of the bottom piece. The lower portion of the bottom piece has at least one access channel in the back face of the bottom piece and extending between the rear conduit channel and the bottom of the bottom piece.

In these respects, the baseboard molding with passage for running electrical conduit therethrough according to the present invention substantially departs from the conventional concepts and designs of the prior art, and in so doing provides an apparatus primarily developed for the purpose of running electrical conduit such as cable wires, stereo wires, and computer wires along a wall structure behind a baseboard molding.

SUMMARY OF THE INVENTION

In view of the foregoing disadvantages inherent in the known types of baseboard molding systems now present in the prior art, the present invention provides a new baseboard molding with passage for running electrical conduit therethrough construction wherein the same can be utilized for running electrical conduit such as cable wires, stereo wires, and computer wires along a wall structure behind a baseboard molding.

The general purpose of the present invention, which will be described subsequently in greater detail, is to provide a new baseboard molding with passage for running electrical conduit therethrough apparatus and method which has many of the advantages of the baseboard molding systems mentioned heretofore and many novel features that result in a new baseboard molding with passage for running electrical conduit therethrough which is not anticipated, rendered obvious, suggested, or even implied by any of the prior art baseboard molding systems, either alone or in any combination thereof.

To attain this, the present invention generally comprises a top piece and a bottom piece. The top piece has a longitudinal tongue ridge downwardly extending from a bottom face of the top piece. A bottom piece has a top, a bottom, front and back faces extending between the top and bottom of the bottom piece, and upper and lower portions. The top of the bottom piece has a spaced apart front and back extents upwardly extending therefrom which define a longitudinal groove therebetween. The tongue ridge of the top piece is inserted into the longitudinal groove of the bottom piece. The upper and lower portions of the bottom piece forming a lower shoulder therebetween on the back face of the bottom piece. The lower shoulder of the bottom piece and the bottom face of the top piece define a rear conduit channel therebetween extending along the back face of the bottom piece. The lower portion of the bottom piece has at least one access channel in the back face of the bottom piece and extending between the rear conduit channel and the bottom of the bottom piece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new baseboard molding with passage for running electrical conduit therethrough apparatus and method which has many of the advantages of the baseboard molding systems mentioned heretofore and many novel features that result in a new baseboard molding with passage for running electrical conduit therethrough which is not anticipated, rendered obvious, suggested, or even implied by any of the prior art baseboard molding systems, either alone or in any combination thereof.

It is another object of the present invention to provide a new baseboard molding with passage for running electrical conduit therethrough which may be easily and efficiently manufactured and marketed.

It is a further object of the present invention to provide a new baseboard molding with passage for running electrical conduit therethrough which is of a durable and reliable construction.

An even further object of the present invention is to provide a new baseboard molding with passage for running electrical conduit therethrough which is susceptible of a low cost of manufacture with regard to both materials and labor, and which accordingly is then susceptible of low prices of sale to the consuming public, thereby making such baseboard molding with passage for running electrical conduit therethrough economically available to the buying public.

Still yet another object of the present invention is to provide a new baseboard molding with passage for running electrical conduit therethrough which provides in the apparatuses and methods of the prior art some of the advantages thereof, while simultaneously overcoming some of the disadvantages normally associated therewith.

Still another object of the present invention is to provide a new baseboard molding with passage for running electrical conduit therethrough for running electrical conduit such as cable wires, stereo wires, and computer wires along a wall structure behind a baseboard molding.

Yet another object of the present invention is to provide a new baseboard molding with passage for running electrical conduit therethrough which includes a top piece and a bottom piece. The top piece has a longitudinal tongue ridge downwardly extending from a bottom face of the top piece. A bottom piece has a top, a bottom, front and back faces extending between the top and bottom of the bottom piece, and upper and lower portions. The top of the bottom piece has a spaced apart front and back extents upwardly extending therefrom which define a longitudinal groove therebetween. The tongue ridge of the top piece is inserted into the longitudinal groove of the bottom piece. The upper and lower portions of the bottom piece forming a lower shoulder therebetween on the back face of the bottom piece. The lower shoulder of the bottom piece and the bottom face of the top piece define a rear conduit channel therebetween extending along the back face of the bottom piece. The lower portion of the bottom piece has at least one access channel in the back face of the bottom piece and extending between the rear conduit channel and the bottom of the bottom piece.

Still yet another object of the present invention is to provide a new baseboard molding with passage for running electrical conduit therethrough that has an top piece that may be interchanged with other top pieces to match various baseboard molding upper configurations that are found in dwelling structures today.

Even still another object of the present invention is to provide a new baseboard molding with passage for running electrical conduit therethrough that has periodic spaced apart notches that let the electrical conduit pass through the baseboard molding and out into the living space of the dwelling structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front perspective view of a new baseboard molding with passage for running electrical conduit therethrough mounted to a wall surface according to the present invention.

FIG. 2 is a schematic transverse cross sectional view of the present invention.

FIG. 3 is a schematic exploded perspective view of the present invention.

FIG. 4 is a schematic rear perspective view of the present invention to illustrate the rear conduit channel and an access channel.

DESCRIPTION OF THE PREFERRED EMBODIMENT

With reference now to the drawings, and in particular to FIGS. 1 through 4 thereof, a new baseboard molding with passage for running electrical conduit therethrough embodying the principles and concepts of the present invention and generally designated by the reference numeral 10 will be described.

As best illustrated in FIGS. 1 through 4, the baseboard molding with passage for running electrical conduit therethrough 10 generally comprises a top piece and a bottom piece. The top piece has a longitudinal tongue ridge downwardly extending from a bottom face of the top piece. A bottom piece has a top, a bottom, front and back faces extending between the top and bottom of the bottom piece, and upper and lower portions. The top of the bottom piece has a spaced apart front and back extents upwardly extending therefrom which define a longitudinal groove therebetween. The tongue ridge of the top piece is inserted into the longitudinal groove of the bottom piece. The upper and lower portions of the bottom piece forming a lower shoulder therebetween on the back face of the bottom piece. The lower shoulder of the bottom piece and the bottom face of the top piece define a rear conduit channel therebetween extending along the back face of the bottom piece. The lower portion of the bottom piece has at least one access channel in the back face of the bottom piece and extending between the rear conduit channel and the bottom of the bottom piece.

In closer detail, the baseboard molding 10 comprises an elongate top piece 11 with top and bottom faces 12,13 and front and back faces 14,15 extending between the top and bottom faces of the top piece. Preferably, the front and back faces of the top piece are extended generally parallel to one another with the bottom face 13 of the top piece extending generally perpendicular to the front and back faces. The top and front faces 12,14 of the top piece may be configured or shaped to have an exterior surface shaped to match various configurations of top portions of existing and future baseboard moldings. The bottom face of the top piece has a downwardly extending longitudinal tongue ridge 16 therealong adjacent the front face of the top piece. Preferably, the tongue ridge of the top piece is generally parallel and flush with the front face of the top piece.

The baseboard molding also comprises an elongate bottom piece 17 having a top 18, a bottom 19, front and back faces 20,21 extending between the top and bottom of the bottom piece, and upper and lower portions 22,23.

The top of the bottom piece has a spaced apart and generally parallel front and back extents 24,25 upwardly extending therefrom. The front and back extents are preferably extended generally parallel to the front face of the bottom piece. The front and back extents of the bottom piece each terminate at an upper edge 26,27 along the respective extent of the bottom piece each preferably lying in generally parallel horizontal planes with one another. The front and back extents of the bottom piece define a longitudinal groove 28 therebetween.

As illustrated in Figures, the tongue ridge of the top piece is inserted into the longitudinal groove of the bottom piece to joint the top and bottom pieces together. The front face 14 of the top piece preferably abuts the front extent of the bottom piece. The bottom face 13 of the top piece preferably abuts the upper edge 27 of the back extent 25 of the bottom piece. Even more preferably, the front and back extents of the bottom piece each have a height defined between the top of the bottom piece and the upper edge of the respective extent of the bottom piece. Preferably, the height of the front extent 24 of the bottom piece is greater than the height of the back extent 25 of the bottom piece so that the front extent rises higher than the back extent to cover a portion of the front face of the top piece.

The baseboard molding is designed for installation in a similar manner as traditional baseboard molding by positioning the baseboard molding adjacent a wall surface preferably adjacent a floor structure with the back faces of the top and bottom pieces facing the wall structure such that the front faces of the top and bottom pieces face outwards from the wall surface. Fasteners may then be extended through the lower portion of the bottom piece to secure the baseboard molding to the wall surface.

With particular reference to FIG. 2, the upper and lower portions each have a width defined between the front and back faces of the bottom piece. The width of the lower portion 23 of the bottom piece is greater than the width of the upper portion 22 of the bottom piece. The front and back extents of the bottom piece have a width defined between the front and back faces of the bottom piece. The width of the front and back extents is less than the width of the lower portion of the bottom piece and greater than the width of the upper portion of the bottom piece. An upper width is defined between the front extent 24 of the bottom piece and the back face 15 of the top piece which is preferably about equal to the width of the lower portion of the bottom piece so that the back face of the top piece and a portion of the back face of the bottom piece located in the lower portion of the bottom piece lie in a generally common vertical plane.

In an ideal illustrative embodiment, the width of the upper portion of the bottom piece is about $\frac{1}{4}$ inch, the width of the bottom portion of the bottom piece is about $\frac{5}{8}$ inch, and the upper width is about $\frac{3}{8}$ inch. In such an ideal embodiment, the width of each extent is about $\frac{1}{8}$ inch and the space between the front and back extents is about $\frac{1}{8}$ inch. Also, in this ideal embodiment, the height of the bottom piece defined between the bottom of the bottom piece and the upper edge of the front extent is about 2 and $\frac{27}{32}$ inches.

The upper and lower portions of the bottom face forming a lower shoulder 29 therebetween on the back face of the bottom piece. The lower shoulder of the bottom piece and the bottom face of the top piece define a rear conduit channel 30 therebetween extending along the back face of the bottom piece. Preferably, the lower shoulder of the bottom piece and the bottom face of the top piece lie in substantially parallel vertical planes with one another.

In use, the baseboard molding for mounting along a bottom of a wall surface for running conduit 31 such as cable wire, telephone wire, stereo wire and computer wire along the wall surface behind the baseboard molding. The rear conduit channel is designed for receiving therein the conduit to permit running of the conduit therealong between the baseboard molding and the wall surface.

The lower portion of the bottom piece has a plurality of spaced apart access channels 32 in the back face of the bottom piece and extending between the rear conduit channel and the bottom of the bottom piece to provide passages into the rear channel from the bottom of the bottom piece. Preferably, the access channels each have a depth defined from the back face of the lower portion of the bottom piece to the back face of the upper portion of the bottom piece such that the rear conduit channel and the access channels each have vertical wall portions 33,34 lying in a common vertical plane with one another. In use, the access channels are designed for dropping conduit in the rear conduit channel to the floor structure and for permitting the dropped conduit to be extended beneath the bottom of the bottom piece outwardly into the living space.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A baseboard molding, comprising:
   a top piece having a longitudinal tongue ridge downwardly extending from a bottom face of said top piece;
   a bottom piece having a top, a bottom, front and back faces extending between said top and bottom of said bottom piece, and upper and lower portions;
   said top of said bottom piece having a spaced apart front and back extents upwardly extending therefrom;
   said front and back extents of said bottom piece defining a longitudinal groove therebetween;
   said tongue ridge of said top piece being inserted into said longitudinal groove of said bottom piece;

said upper and lower portions of said bottom piece forming a lower shoulder therebetween on said back face of said bottom piece;

said lower shoulder of said bottom piece and said bottom face of said top piece defining a rear conduit channel therebetween extending along said back face of said bottom piece; and said lower portion of said bottom piece having at least one access channel in said back face of said bottom piece and extending between said rear conduit channel and said bottom of said bottom piece.

2. The baseboard molding of claim 1, wherein said longitudinal tongue ridge of said top piece is extending generally flush along a front face of said top piece.

3. The baseboard molding of claim 1, wherein said front and back extents are extended generally parallel to one another.

4. The baseboard molding of claim 2, wherein said front and back extents of said bottom piece each terminate at an upper edge, wherein said front and back extents of said bottom piece each have a height defined between said top of said bottom piece and said upper edge of the respective extent of said bottom piece, wherein said height of said front extent of said bottom piece is greater than said height of said back extent of said bottom piece.

5. The baseboard molding of claim 1, wherein said upper and lower portions each have a width defined between said front and back faces of said bottom piece, and wherein said width of said lower portion of said bottom piece is greater than said width of said upper portion of said bottom piece.

6. The baseboard molding of claim 5, wherein said front and back extents of said bottom piece have a width defined between said front and back faces of said bottom piece, wherein said width of said front and back extents is less than said width of said lower portion of said bottom piece and greater than said width of said upper portion of said bottom piece.

7. The baseboard molding of claim 6, wherein an upper width is defined between said front extent of said bottom piece and a back face of said top piece, wherein said upper width is about equal to said width of said lower portion of said bottom piece such that said back face of said top piece and a portion of said back face of said bottom piece located in said lower portion of said bottom piece lie in a generally common plane.

8. A baseboard molding for mounting along a bottom of a wall surface for running conduit along the wall surface behind the baseboard molding, said baseboard molding comprising:

a top piece having top and bottom faces and front and back faces extending between said top and bottom faces of said top piece;

said front and back faces of said top piece being extended generally parallel to one another, said bottom face of said top piece being extended generally perpendicular to said front and back faces;

said bottom face of said top piece having a downwardly extending longitudinal tongue ridge therealong adjacent said front face of said top piece, said tongue ridge of said top piece being generally parallel and flush with said front face of said top piece;

a bottom piece having a top, a bottom, front and back faces extending between said top and bottom of said bottom piece, and upper and lower portions;

said top of said bottom piece having a spaced apart and generally parallel front and back extents upwardly extending therefrom, said front and back extents being extended generally parallel to said front face of said bottom piece;

said front and back extents of said bottom piece each terminating at an upper edge each lying in generally parallel planes with one another;

said front and back extents of said bottom piece each having a height defined between said top of said bottom piece and said upper edge of the respective extent of said bottom piece;

said height of said front extent of said bottom piece being greater than said height of said back extent of said bottom piece;

said front and back extents of said bottom piece defining a longitudinal groove therebetween;

said tongue ridge of said top piece being inserted into said longitudinal groove of said bottom piece;

said front face of said top piece abutting said front extent of said bottom piece, said bottom face of said top piece abutting said upper edge of said back extent of said bottom piece;

said upper and lower portions each having a width defined between said front and back faces of said bottom piece, said width of said lower portion of said bottom piece being greater than said width of said upper portion of said bottom piece;

said front and back extents of said bottom piece having a width defined between said front and back faces of said bottom piece, said width of said front and back extents being less than said width of said lower portion of said bottom piece and greater than said width of said upper portion of said bottom piece;

an upper width being defined between said front extent of said bottom piece and said back face of said top piece, said upper width being about equal to said width of said lower portion of said bottom piece such that said back face of said top piece and a portion of said back face of said bottom piece located in said lower portion of said bottom piece lie in a generally common plane;

said upper and lower portions of said bottom face forming a lower shoulder therebetween on said back face of said bottom piece;

said lower shoulder of said bottom piece and said bottom face of said top piece defining a rear conduit channel therebetween extending along said back face of said bottom piece, said lower shoulder of said bottom piece and said bottom face of said top piece lying in substantially parallel planes with one another;

said rear conduit channel being adapted for receiving therein conduit to permit running of said conduit therealong;

said lower portion of said bottom piece having a plurality of spaced apart access channels in said back face of said bottom piece and extending between said rear conduit channel and said bottom of said bottom piece to provide passages into said rear channel from said bottom of said bottom piece; and said access channels each having a depth defined from said back face of said lower portion of said bottom piece to said back face of said upper portion of said bottom piece such that said rear conduit channel and said access channels each have vertical wall portions lying in a common vertical plane with one another.

* * * * *